United States Patent Office 3,116,224
Patented Dec. 31, 1963

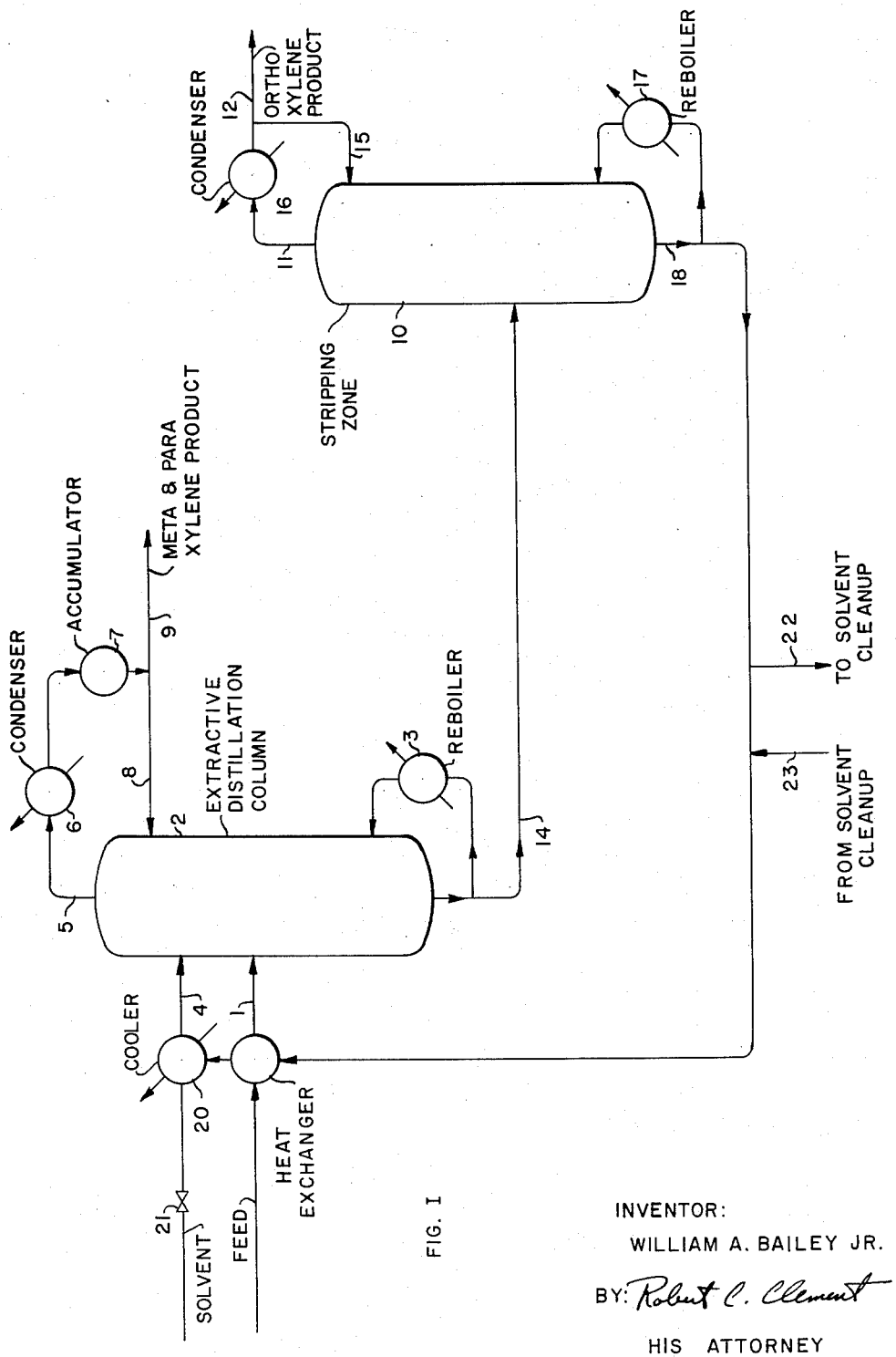
FIG. I

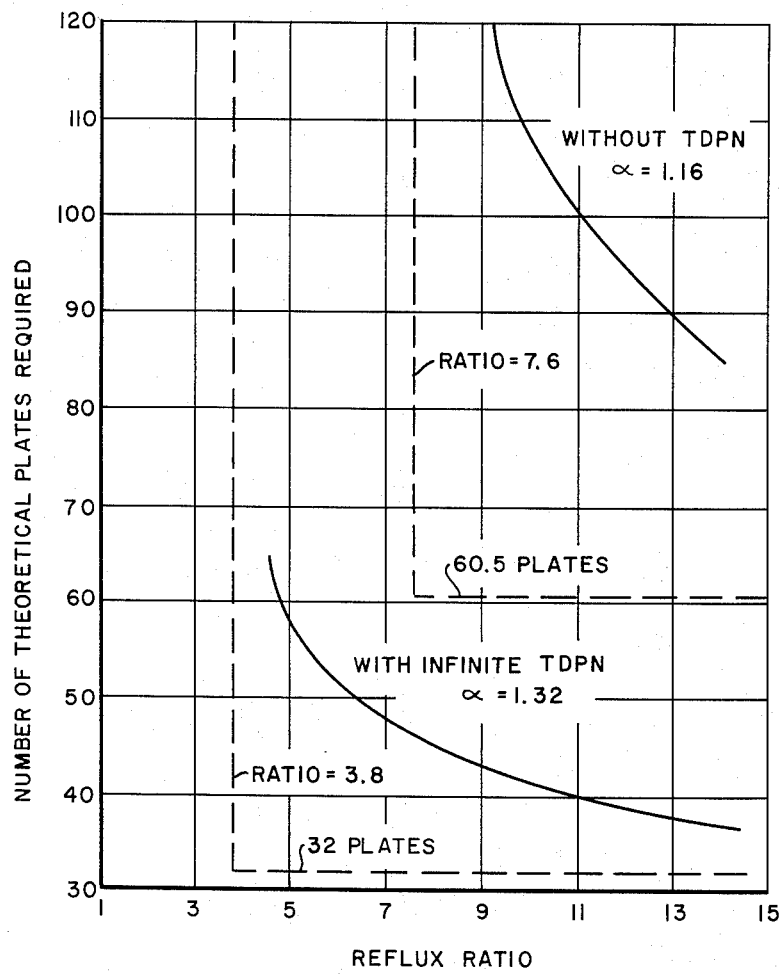
FIG. II

3,116,224
EXTRACTIVE DISTILLATION
William A. Bailey, Jr., Houston, Tex., assignor to Shell Oil Company, New York, N.Y., a corporation of Delaware
Filed July 3, 1961, Ser. No. 121,428
2 Claims. (Cl. 202—39.5)

The present invention relates to an improved method for the recovery of ortho-isomers of certain aromatic materials from hydrocarbon mixtures containing mixtures of isomers and more particularly, the invention is concerned with the separation of high purity ortho-isomers from a mixture of hydrocarbons consisting predominantly of ortho-, meta- and para-isomers.

Mixtures of aromatic isomers such as ortho-, meta- and para-xylenes are produced as by-products from coking, of coal, and from various petroleum conversion and separation processes. Although ortho-xylene at atmospheric pressure boils at about 144.4° C. and meta-xylene and para-xylene under atmospheric pressure boil at about 139.2° C. and about 138.5° C., respectively, the recovery of high purity ortho-xylene from a mixture of xylene isomers is extremely difficult by ordinary distillation methods.

It is well known that extremely rigorous fractionation processes are necessary to separate high purity ortho-isomers of various aromatic materials from hydrocarbon mixtures containing the isomers thereof. Other physical methods such as azeotropic distillation, percolation through active adsorbents as well as fractional release from high solvent-retentive polymers have likewise proved commercially ineffective for the separation of isomers such as ortho-xylene from hydrocarbon mixtures containing meta- and para-xylenes. One suitable means heretofore employed for the separation of ortho-xylene has been by involved chemical methods which are not particularly adaptable to large-scale commercial usage. It is also known to employ methods such as extraction with selective solvents, super fractionation and fractional crystallization for the recovery of high purity ortho-isomers. However, in general these methods have not been entirely acceptable.

Therefore, it is an object of this invention to provide an improved process for the separation of ortho-isomers from a hydrocarbon mixture containing substantial amounts of meta- and para-isomers. It is a further object of this invention to provide an improved extractive distillation process for the recovery of ortho-xylenes from hydrocarbon mixtures containing meta- and para-xylenes. It is another object of this invention to provide an improved extractive distillation process utilizing $\beta,\beta'$-thiodipropionitrile for the recovery of ortho-isomers from mixtures of hydrocarbons containing predominantly ortho-, meta- and para-isomers. Another object of the invention is to secure pure or substantially pure ortho-isomers from a mixture of hydrocarbons containing ortho-, meta- and para-isomers. A particular object of the invention is to separate ortho-xylene from a mixture of hydrocarbons having similar boiling ranges. Another object is to provide an improved extractive distillation process wherein $\beta,\beta'$-thiodipropionitrile is used as the selective solvent which permits an economically feasible high recovery of ortho-xylene from a close boiling hydrocarbon mixture containing ortho-, meta- and para-xylenes. Other objects and advantages of this invention will become apparent in the description thereof which is made with reference to the accompanying drawing (FIGURE I), which is a schematic diagram of a preferred embodiment of the process for separating ortho-xylene from a hydrocarbon mixture containing ortho-, meta- and para-xylenes, and FIGURE II, which is a graph showing the number of theoretical plates required at varying reflux ratios in an extractive distillation of ortho-xylene using $\beta,\beta'$-thiodipropionitrile as the selective solvent.

It has now been discovered that $\beta,\beta'$-thiodipropionitrile can be used as a selective solvent in an extractive distillation process for the recovery of ortho-isomers from hydrocarbon feed mixtures containing ortho-, meta- and para-isomers. For it has been found that $\beta,\beta'$-thiodipropionitrile has a sufficient selectivity for ortho-isomers over meta- and para-isomers and other close-boiling hydrocarbon compounds so that it can advantageously be used as a selective solvent in an extractive distillation process. Quite unexpectedly, it has been discovered that the theoretical plate and reflux requirements of the instant extractive distillation process are substantially reduced when compared to an ordinary distillation process for the recovery of ortho-isomers. Moreover, it has further been discovered that ortho-isomers such as ortho-xylene can be separated by the herein claimed extractive distillation process using $\beta,\beta'$-thiodipropionitrile even when the feed also contains large amounts of close boiling saturate materials. That is, saturates boiling in the ortho-isomer boiling range have been found to have lower retention times than ortho-isomers in $\beta,\beta'$-thiodipropionitrile (based on gas liquid chromatography data wherein the solvent is the stationary phase). Accordingly, it has been found that these saturates can be readily distilled overhead along with the meta- and para-isomers in the extractive distillation process of the invention.

The effect of $\beta,\beta'$-thiodipropionitrile on the theoretical plate requirement for an ortho-xylene extractive distillation process has been determined using gas liquid chromatography analysis. The relative volatility of meta- and para-xylene to ortho-xylene (that is the alpha value ($\alpha$)) is 1.16 at 227° F. At infinite dilution in $\beta,\beta'$-thiodipropionitrile, $\alpha$ is increased to 1.32. Based on the $\alpha$ at 227° F., the plate requirements for the separation of 98% pure ortho-xylene from a mixture consisting of about 80% v. meta- and para-xylenes and about 20% v. ortho-xylene as a function of reflux ratio, are shown in FIGURE II. That is, at total reflux, 60.5 theoretical plates are required in ordinary distillation of ortho-xylene from the above described mixture, as compared to 32 plates required in an extractive distillation of ortho-xylene from a similar mixture using $\beta,\beta'$-thiodipropionitrile. The minimum reflux ratio at infinite stages is reduced from 7.6 to 3.8. This reduction in plate and reflux requirement would of course be less at finite solvent dilution. The lower reflux ratio requirement in the instant extractive distillation process results in an extractive distillation column substantially reduced in size and also in a reduction in the amount of material to be vaporized. Moreover, if saturates are present in the feed, no pretreatment such as extraction of the xylene cut would be required prior to extractive distillation.

Gas liquid chromatography data for various hydrocarbons, including the xylene isomers in β,β'-thiodipropionitrile are set forth in Table I below.

TABLE I

*GLC Data for Various Hydrocarbons in β,β'-Thiodipropionitrile*

|  | Retention Time, minutes | |
| --- | --- | --- |
|  | at 105.7° V.[1] | at 120.0° V.[1] |
| Benzene | 0.615 | 0.635 |
| Toluene | 1.000 | 1.000 |
| o-Xylene | 2.150 | 2.052 |
| p-Xylene | 1.575 | 1.517 |
| m-Xylene | 1.587 | 1.536 |
| Ethylbenzene | 1.466 | 1.426 |
| n-Propylbenzene | 2.010 | 1.915 |
| i-Propylbenzene | 1.699 | 1.635 |
| 1-methyl-2-ethylbenzene | 2.960 | 2.733 |
| 1-methyl-3-ethylbenzene | 2.274 | 2.142 |
| 1-methyl-4-ethylbenzene | 2.318 | 2.166 |
| 1,2,3-trimethylbenzene | 4.597 | |
| 1,2,4-trimethylbenzene | 3.299 | |
| 1,3,5-trimethylbenzene | 2.471 | 2.312 |
| n-Butylbenzene | 3.145 | |
| i-Butylbenzene | 2.131 | |
| Sec-butylbenzene | 2.249 | |
| Tert-butylbenzene | 2.250 | |
| n-Hendecane (C₁₁) | 0.468 | |

[1] Retention times at 105.7° C. and 120.0° C. are relative to toluene.

From Table I it is readily apparent that the increased retention time (at varying temperatures) of ortho-xylene in β,β'-thiodipropionitrile as compared to that of para- and meta-xylene (2.150 vs. 1.57 and 1.587 minutes respectively) is a significant factor in the effective separation of ortho-xylene from a mixture of xylene isomers in the instantly claimed extractive distillation process.

The instant extractive distillation process, using β,β'-thiodipropionitrile as the selective solvent, can be used to separate ortho-isomers from other aromatic isomers of a broad class of hydrocarbons. That is, the ortho-isomers can be separated from mixtures of hydrocarbons containing isomers. That is, the ortho-isomer having the structural formula

can be separated from isomers having the structural formula

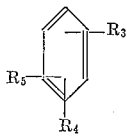

wherein $R_1$, $R_2$, $R_3$, $R_4$ and $R_5$ can be hydrogen or low-molecular-weight alkyl radicals having from one to at least eight carbon atoms with at least two of the R's being alkyl groups.

For example, 1,2-di-n-butylbenzene can be separated from a mixture also containing 1,3- and 1,4-di-n-butylbenzene. Similarly, 1,2-dioctylbenzene can be separated from a mixture of hydrocarbons containing in addition thereto 1,4-dioctylbenzene.

In the improved extractive distillation process of the invention, the β,β'-thiodipropionitrile selective solvent is introduced into a higher level of the extractive distillation zones with the hydrocarbon feed stock containing ortho-, meta- and para-isomers being admitted at a lower level of the zone. The β,β'-thiodipropionitrile selective solvent serves to reduce the volatility of the ortho-isomer relative to that of meta- and para-isomers and the other close boiling components of the feed stock, thus permitting the removal of the pure ortho-isomer in the extract phase which contains little or insignificant amounts of meta- and para-isomers. The extract phase is removed from the bottom of the extractive distillation zone. The β,β'-thiodipropionitrile solvent is separated from the ortho-isomer in a separate distillation zone with the solvent being removed as distillation bottoms and recycled to the higher level of the extractive distillation zone. The ortho-isomer is taken overhead from the distillation zone as a high purity finished product. In a preferred embodiment of the invention the ortho-isomer is steam distilled from the solvent.

The conditions of the extractive distillation process of the invention need not differ greatly from those commonly employed in the removal of aromatics from comparable streams in other extractive distillation processes with high boiling selective solvents. Moreover, the conditions of temperature, pressure and concentration in the extractive distillation process of the invention are selected so that no second liquid phase is formed. The temperature for the extractive distillation process of the invention may range within wide limits provided it is above the bubble temperature of the mixture and substantially below the boiling temperature of the solvent under the pressure and temperature conditions maintained in the extractive distillation zone. Subatmospheric pressures may be resorted to in order to reduce the temperature if the mixture is not thermally stable at high temperature. Suitable temperatures for the process range from about the melting point of β,β'-thiodipropionitrile up to about the boiling point at pressures from 0.1 p.s.i. absolute to about 500 p.s.i. absolute. The most suitable operating temperature varies with the pressure maintained during the operation and is generally a compromise since in general the selectivity of this solvent seems to decrease with an increase of temperature while simultaneously there is an increase in the absolute solubility as the temperature is increased. In a preferred embodiment of the invention, pressures from about 7 to about 15 p.s.i.a. are maintained in the extractive distillation column and stripping column; and the extractive distillation and stripping are conducted at temperatures from about 100° C. to about 150° C.

The extractive distillation process of the present invention is preferably carried out continuously. By flowing the β,β'-thiodipropionitrile selective solvent down the extractive distillation column as the distillation proceeds, the less soluble feed components, namely the meta- and para-isomers and any saturates or other hydrocarbons contained therein, are passed overhead while the selective solvent scrubs the soluble ortho-isomer component from the vapor. In the extractive distillation process of the present invention, it is preferred to introduce the β,β'-thiodipropionitrile solvent into the extractive distillation zone at some point below the top of the zone in order that the plates above the solvent port may function to prevent loss of solvent overhead. That portion above the introduction of the solvent into the extractive distillation zone is generally referred to as the "rectifying zone" as opposed to that portion of the system below the solvent feed port which is generally referred to as the "extractive distillation zone." It is evident that the rectifying zone may also be a separate structural unit. The β,β'-thiodipropionitrile selective solvent can be introduced into the extractive distillation zone at a temperature equal to the normal equilibrium temperature of the zone at that point, or at least, a part of the solvent can be introduced into the zone at a temperature higher than the normal equilibrium temperature at that point in the zone.

The separation of the solvent from that component which is not selectively dissolved (that is overhead) in an extractive distillation process oftentimes presents a difficult problem. That is, the difficulty of this separation, which takes place in the rectifying zone, is a function of the relative volatility of the overhead with respect to the solvent. Depending on this relative volatility, it is sometimes necessary to employ an excessively large number of plates in the rectifying zone or alternatively to increase the reflux ratio in this zone of the column in order to prevent loss of valuable solvent in the overhead. Indeed, in some extractive distillation cases the reflux in the extractive distillation zone is below the minimum reflux of the rectifying zone and thus a higher reflux is required in the rectifying zone rather than the extractive distillation zone, irrespective of the number of plates in the rectifying zone. An increase in reflux in the rectifying zone can of course be brought about by increasing the reflux in the whole column. However, so doing will increase the vapor and liquid load in the extractive distillation zone. Any increase in the liquid load in the extractive zone must be accompanied by an increase in solvent feed in order to maintain a given concentration of solvent on the plates which is necessary to maintain a given degree of separation of the components in the feed. In the present extractive distillation process, applicant is able to carry out a satisfactory separation between the overhead (meta- and para-isomers and saturates) and the β,β'-thiodipropionitrile solvent without altering the optimum reflux ratio in that portion of the column below the solvent feed port, which is principally concerned with separation of the components of the feed. As seen from the data set forth in Table I above, this relatively easy separation of solvent from overhead and the reduction in theoretical plates required (see FIGURE II) in the rectifying zone is primarily due to the unique properties of the β,β'-thiodipropionitrile selective solvent with respect to the extractive distillation of ortho-isomers from meta- and para-isomers. In the extractive distillation of the present invention, the reflux to feed ratio, the solvent to feed ratio and the solvent concentration are so correlated as to result in over-all optimum efficiency.

Many different ortho-isomer-containing hydrocarbon mixtures may be separated by the extractive distillation process of the present invention. However, a preferred embodiment of the invention is the recovery of ortho-isomers from hydrocarbon feed mixtures containing from about 5 to about 50% by volume ortho-isomers and from about 30 to about 95% by volume of mixtures of meta- and para-isomers and from about 0 to about 20% by volume of saturates. In a more preferred embodiment, the hydrocarbon mixture contains about 20% v. ortho-xylene. The feed mixtures are at least partially vaporizable at temperatures substantially below the boiling temperature of the β,β'-thiodipropionitrile solvent and are inert toward the solvent. Moreover, the presence of the solvent in the mixture causes a greater change in the "escaping tendency" of the ortho-isomer relative to that of the other components of the mixture. By "escaping tendency" is meant the potential of one component to pass from the liquid to the vapor phase. Some specific examples of hydrocarbon mixtures which may be extractively distilled in accordance with the present invention to recover ortho-isomers in high purity are: (1) the distillation bottoms from a refinery platformate stream containing xylene from which the benzene and toluene have been recovered (such a xylene stream might contain material heavier than ortho-xylene and therefore an additional fractionation would be required in which the xylenes (meta-, para- and ortho-) and lower boiling saturates are taken overhead); and (2) a catalytically cracked gasoline. Generally the different types of mixtures of ortho-isomer containing hydrocarbon compounds which can be separated by the extractive distillation process of the present invention cannot be separated by ordinary fractional distillation.

The apparatus employed may be any conventional or convenient type known to those skilled in the art. For simplicity, FIGURE I does not show all the pumps, tanks, heat exchangers, valves, by-passes, vents, reboilers, condensers, coolers and other auxiliaries that may be necessary for the proper operation of the process but the inclusion of which will be evident to those skilled in the art.

The amount of the solvent should be at least sufficient to dissolve the ortho-xylene present in the hydrocarbon feed mixture. In some cases a considerable excess over this amount may be used especially when it is desired to scrub the last traces of the more soluble constituents from the vapor. The most economical amount varies with the nature of the particular feed involved and the temperatures and pressures employed. This amount can be determined experimentally. Useful solvent-to-feed ratios in the extractive distillation column may range from about 0.75/1 to about 20/1 by volume and preferably not more than 5/1 by volume. It is further preferred that the solvent-to-feed ratio be from about 3/1 to about 1.5/1.

Referring to FIGURE I of the drawing, the feed mixture containing ortho-, meta- and para-xylenes is introduced into column 2 as a liquid or vapor through line 1. Extractive distillation column 2 is equipped with reboiler 3 and with several trays such as valve trays, grid trays, and the like to improve the vapor-liquid contacting. The β,β'-thiodipropionitrile selective solvent is admitted to column 2 by line 4 at a point above the entry of the feed and flowed down the extractive distillation zone of column 2, i.e., the portion of column 2 below solvent inlet 4, which contains a number of actual plates equivalent to the theoretical plate requirement for the process. The β,β'-thiodipropionitrile selective solvent exerts its vapor pressure-altering effect on the ortho-xylene and selectively dissolves the ascending feed vapors flowing countercurrently thereto.

Vapors rich in meta- and para-xylenes and the other components of the hydrocarbon feed pass overhead via line 5 to condenser 6. The condensed vapors collect in accumulator 7. A portion of the condensed overhead is returned to the extractive distillation column as reflux by line 8, while the remainder of the top product containing meta- and para-xylenes and other components of the feed is passed to storage (not shown) through line 9. That portion of column 2 between reflux inlet 8 and solvent inlet 4 (stripping section) is equivalent to the requisite number of theoretical plates (with the particular reflux-to-feed ratio employed) to prevent the β,β'-thiodipropionitrile solvent from passing overhead with the top product. In some cases it is desirable to make this section a separate column. The extract phase (i.e., fat solvent) comprising the β,β'-thiodipropionitrile solvent and the selectively adsorbed ortho-xylene component of the feed mixture is withdrawn from column 2 through bottom line 14. A portion of the withdrawn extract is recycled to the column through reboiler 3. The remaining fat solvent is continuously stripped in solvent stripping zone 10. The ortho-xylene portion of the fat solvent solution is taken overhead through line 11 into condenser 16. The finished high purity ortho-xylene product is withdrawn through line 12. A portion of the ortho-xylene is recycled to the solvent stripping zone through line 15 as reflux to knockback the solvent in the overhead stream of the solvent stripping zone. Stripping column 10 is equipped with reboiler 17. The lean β,β'-thiodiproprionitrile solvent passes out of distillation zone 10 through line 18 and is reintroduced into extractive distillation column 2 at a point above the feed entry after passing through heat exchanger 19 and cooler 20. Valved line 21 is provided for the addition of fresh solvent to the system as required. A slip stream of approximately 5–10% by volume of the total solvent inventory can be passed through line 22 to a solvent clean-up system (not shown) including a flasher or vacuum column during each 24-hour period of separation to remove contaminants. After solvent clean-up, the solvent can be returned to line 18 through line 23.

I claim as my invention:

1. An extractive distillation process for separating ortho-xylene from hydrocarbon feeds containing a substantial concentration of ortho-xylene, meta-xylene, and para-xylene which comprises distilling the hydrocarbon feed in the presence of a compound consisting essentially of beta-beta'-thiodipropionitrile and selectively dissolving the ortho-xylene from the hydrocarbon feed, maintaining the temperature and pressure in the extractive distillation column from about 100° C. to about 150° C. and from about 7 p.s.i.a. to about 15 p.s.i.a., respectively, and further maintaining the solvent-to-feed ratio in the extractive distillation column from 1 to 3.0.

2. A process according to claim 1 wherein the concentration of ortho-xylene in the hydrocarbon feed is from 5 to 95% by volume.

References Cited in the file of this patent

UNITED STATES PATENTS

| | | |
|---|---|---|
| 2,494,274 | Woerner | Jan. 10, 1950 |
| 2,721,170 | Johnson | Oct. 18, 1955 |
| 2,763,604 | Dorsey et al. | Sept. 18, 1956 |
| 2,842,484 | Fleck | July 8, 1958 |
| 3,007,956 | Linville et al. | Nov. 7, 1961 |

OTHER REFERENCES

"Petroleum Refiner," vol. 30, July 1951, pp. 97–100.

"Selective Solvents for Aromatic Hydrocarbons," D. A. Skinner, Industrial and Engineering Chemistry, vol. 47, No. 2, February 1955, pp. 222–229.